United States Patent [19]
Lew

[11] 4,125,338
[45] Nov. 14, 1978

[54] QUATREFOIL CONNECTOR CONNECTING SHELVES

[76] Inventor: Hyok S. Lew, 7890 Oak St., Arvada, Colo. 80005

[21] Appl. No.: 766,364

[22] Filed: Feb. 7, 1977

[51] Int. Cl.² ............................................. F16B 5/00
[52] U.S. Cl. .................................... 403/169; 52/285; 52/585; 52/591; 312/263; 403/231; 403/381
[58] Field of Search .................... 108/64, 114; 52/281, 52/282, 285, 284, 591, 594, 582, 585; 403/231, 331, 381, 409, 292, 295, 406, 169; 312/263, 195

[56] References Cited

U.S. PATENT DOCUMENTS

| | | | |
|---|---|---|---|
| 1,898,297 | 2/1933 | Fox | 46/29 |
| 3,186,561 | 6/1965 | Strässle | 52/282 X |
| 3,295,281 | 1/1967 | Dixon | 52/585 X |
| 3,491,896 | 1/1970 | Crary | 108/111 |
| 3,547,472 | 12/1970 | Ehrman | 52/591 X |

*Primary Examiner*—Wayne L. Shedd

[57] ABSTRACT

A new method of joining boards in the "Cross" connection, "Tee" connection and "Angle" connection is disclosed, which type of connections are widely employed in constructing book shelves, cabinets, etc. Said method of joining boards comprising at a rectangular bar with grooves formed into each of four sides of the bar resulting in a quatrefoil-shaped cross section of the bar and a "cross," "tee" or "angle" made of a metallic rod. The boards to be joined have a hole disposed at the end face, which hole receives an arm of said "cross," "tee" or "angle" depending on the type of joint. The end face of the board has a protrusion built parallel to the plane of the board, which protrusion has a narrower dimension at the root resulting in a cross section similar to that of a rail road. Of course, said grooves formed on said rectangular bar has matching cross sections to receive said rail-like protrusions on the end face of the board in a sliding relationship. The angular position of each of the boards joined together is set by the "cross" engaging the holes disposed on the end face of the boards. Then, the connection is completed by pressing a bar with a quatrefoil cross section into the quatrefoil shaped cavity formed by the ends of the four boards to be joined together. It is self-evident that this principle of "cross" connection can be readily applied to "tee" or "angular" connections.

7 Claims, 6 Drawing Figures

QUATREFOIL CONNECTOR CONNECTING SHELVES

The use of the modular structures in constructing book shelves and other storage shelves are advantageous because a large assembly of shelves can be constructed by using boards of relatively small sizes, which cost much less compared to boards of a larger size, as a flawless board of larger size is harder to come by. Another advantage of the modular method is the facility in moving the shelf assembly, as such a method of construction enables and to disassemble book shelves and pile up the component shelves. A further advantage of the modular structure is the flexibility in assembling a book shelf to meet a specifically required size, which can be done by selecting the proper size board and assembling it at home.

The primary object of the present invention is to provide a means of connecting boards to each other in right angle without permanently joining them.

Another object of the present invention is to provide a means of connecting boards in right angle into a sturdy and geometrically precise joint.

Still another object of the present invention is to provide a means of connecting boards in right angles without using any special tools.

A further object of the present invention is to provide a means of connecting boards in right angles, which is neat and elegant in appearance.

Still a further object of the present invention is to provide a means to construct a book shelf or storage shelf of a particular size meeting an individual requirement by choosing the proper combination of sizes of pre-cut boards and then assembling them at home.

These and other objects of the present invention will become clear as the description of the present invention progresses.

The present invention may be described with a greater clarity and specificity by referring to the following figures.

Figure 1:
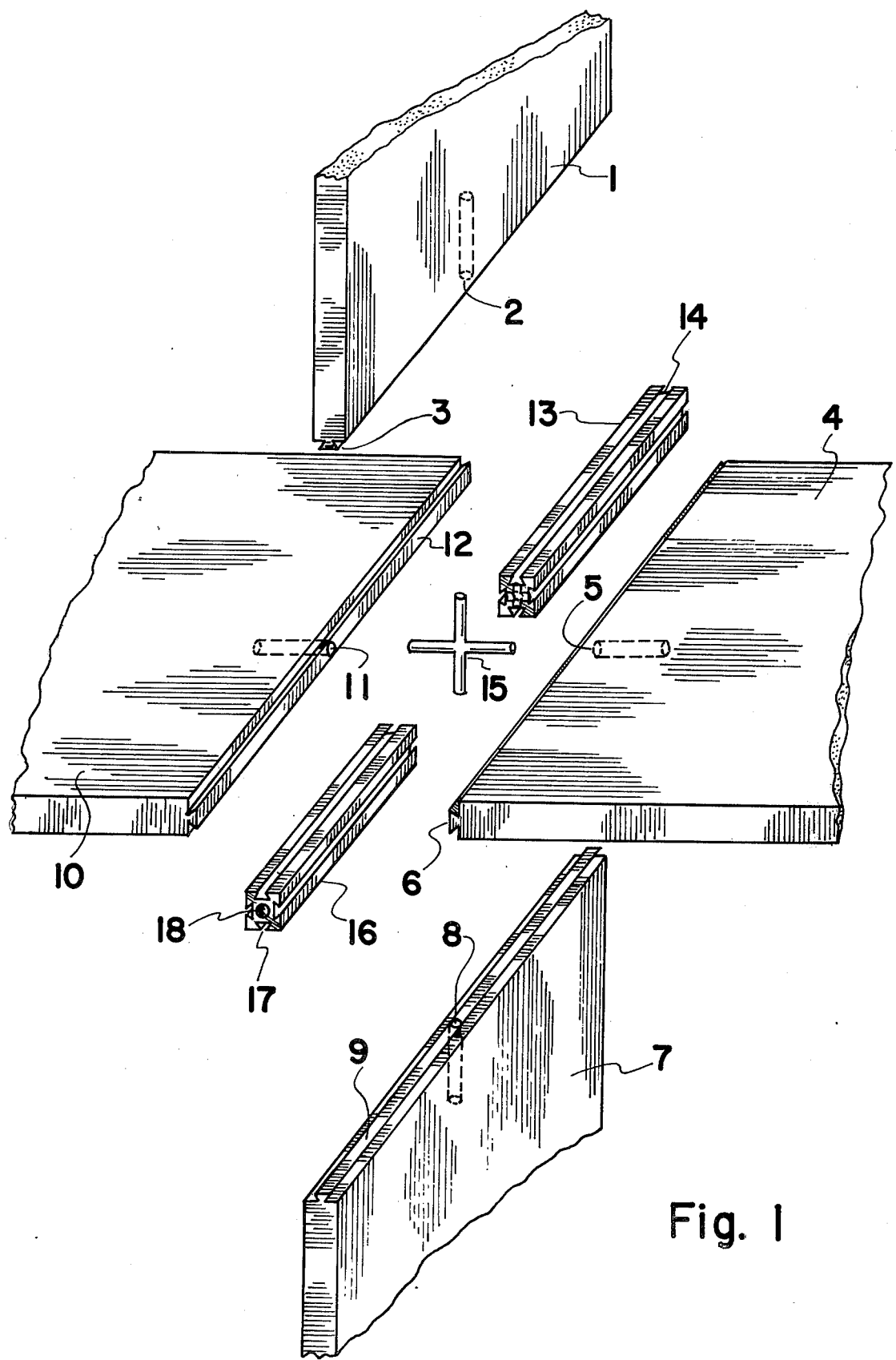
FIG. 1 is an exploded view of the "cross" joint of four boards made in accordance with the principle of the present invention.

In FIG. 1, there is shown an exploded view of the "cross" joint made in accordance with the principle of the present invention. A pair of vertical shelves 1 and 7 and another pair of horizontal shelves 4 and 10 are cross-jointed to each other by means of a cross 15 and a pair of bar 13 and 14. Each of shelves 1, 4, 7 and 10 has holes 2, 5, 8 and 11 disposed on the end face of each shelf, respectively, and rail-like protrusions 3, 6, 9 and 12 formed on the end face of each shelf, respectively. In assembling the "cross" joint shown in FIG. 1, shelves 1, 4, 7 and 10 are brought to an angular arrangement of a cross, in which each of four arms of cross 15 engages each of holes 2, 5, 8 and 11 disposed on the end face of each shelf. It is easily understood that such an arrangement leaves a cavity of cross section of a quatrefoil along the axis of the joint. The bar 16 with cross section of a quatrefoil matching the cross section of said cavity is then pressed into the front half of said cavity from the front and another bar 13 of the same cross section is pressed into the rear half of said cavity from the rear. The rail-like protrusions 3, 6, 9 and 12 of the shelves having a narrowed-down root slidably engaging grooves 14 and 17 of bar 13 and 16 having narrowed-down opening prevents the shelves from disengaging from the joint in linear motion, while four arms of cross 15 engaging holes 2, 5, 8 and 11 prevents the shelves from distorting in angular motion. It is not difficult to understand that this method of joint is highly rigid mechanically and very precise geometrically, yet it is very simple, inexpensive and easy to assemble. The threaded hole 18 disposed on the end face of bar 16 may be provided to enable to pull out the bar 16 with a plier grabbing a bolt threaded into hole 18 in disassembling the joint of said shelves. It should be understood that cross 15 may be eliminated and yet a sturdy cross joint can be accomplished by tight-fitting the rail-like protrusion into mating grooves.

Figure 2:
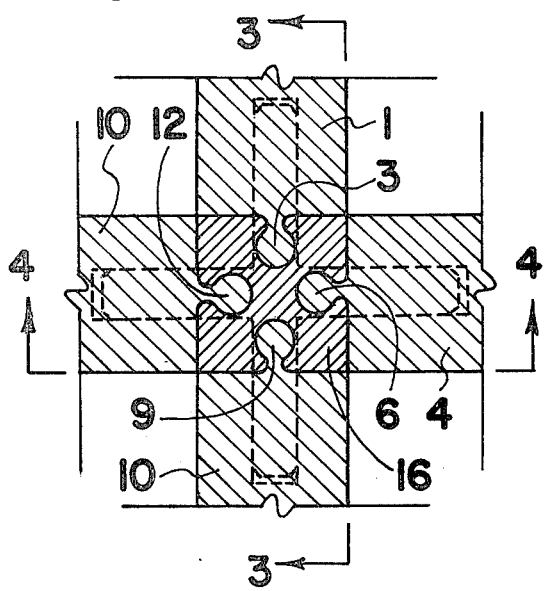
FIG. 2 is a detail of the cross section taken along a plane perpendicular to the axis of the joints shown in FIG. 1.

In FIG. 2, there is shown a cross section of the cross-joint shown in FIG. 1 taken along a plane normal to the axis of the joint. Here, the ideal shape of the cross section of the rail-like protrusion 3, 6, 9 and 12 formed on the end face of the shelves and their mating grooves formed on the bar 16 is shown in a greater detail. By eliminating the sharp notches at the neck of the rail-like protrusions and at the root of mating grooves, the stress concentration can be avoided and a great strength of the joint can be achieved.

Figure 3:
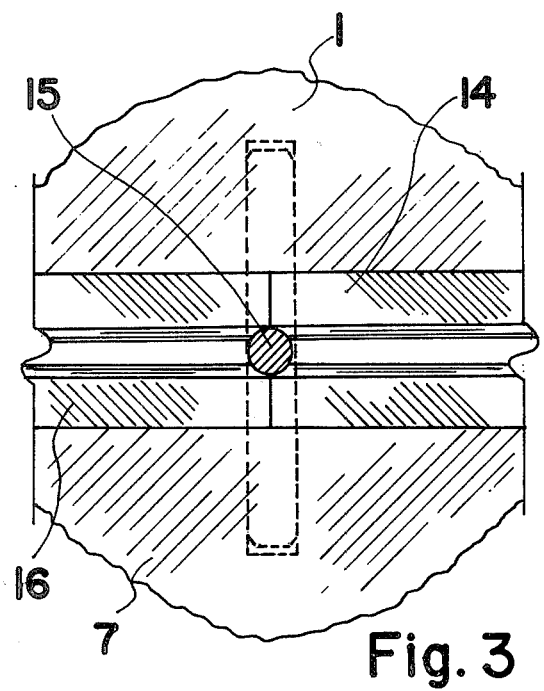
FIG. 3 is a cross section taken along a plane 3—3 as shown in FIG. 2.

There is illustrated in FIG. 3 showing a cross section of the cross joint taken along a plane 3—3 as shown in FIG. 2, where it is shown that a cross-shaped groove with semicircular cross section is formed into each of two mating end-face of bars 13 and 14, into which groove cross 15 fits into.

Figure 4:
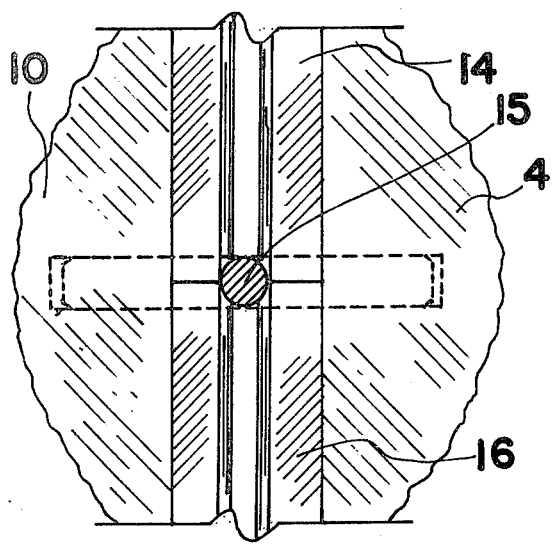
FIG. 4 is a cross section taken along a plane 4—4 as shown in FIG. 2.

In FIG. 4, there is shown a cross section of the cross joint taken along a plane 4—4 as shown in FIG. 2, which further illustrates the structure of the mating end-faces of bar 14 and 16, which accommodates cross 15.

Figure 5:
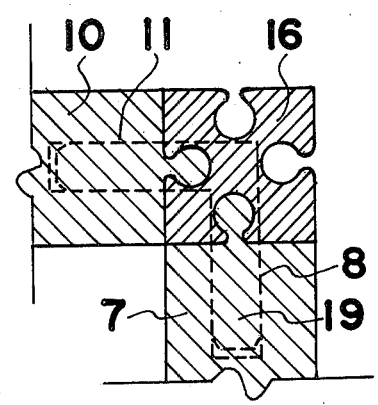
FIG. 5 is a cross section of the "angle" joint made in accordance with the principle of the present invention.

In FIG. 5, there is shown a cross section of the angle-joint taken along a plane normal to the axis of joint, which is made in accordance with the principle of the present invention. Here, an angle 19 engaging holes 8 and 11 disposed on shelves 7 and 10 is employed in place of cross 15. It is immediately noticed that only two of four grooves of bar 18 is utilized in the angle joint. To achieve a greater elegance in appearance, one may use a bar with only two grooves or those grooves not utilized may be filled up by using a filling strip as shown in FIG. 6.

Figure 6:
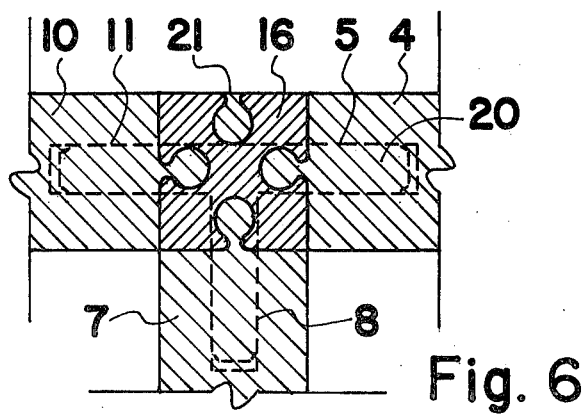
FIG. 6 is cross section of the "tee" joint made in accordance with the principle of the present invention.

There is shown in FIG. 6 a cross section of the tee-joint taken along a plane normal to the axis of joint, which is made in accordance with the principle of the present invention. Here, a tee 20 engaging holes 5, 8 and 11 respectively disposed on the end-faces of shelves 4, 7 and 10 is employed in place of cross 15. It should be noticed that a filling strip 21 is used to fill up the unused groove of bar 16.

While the principles of the invention have now been made clear in an illustrative embodiment, there will be immediately obvious to those skilled in the art modifications of structures, arrangement, proportions, the elements, materials, and components used in the practice of the invention which are particularly adapted for specific environments and operating requirements without departing from those principles.

I claim:

1. Apparatus joining four boards into a "cross-joint,"- wherein said four boards are joined to each other with an angle of 90° between any two adjacent boards, each of said boards having a front edge and a rear edge, said apparatus comprising in combination:
    (a) a rail-like protrusion formed on the end face of each of said boards, said rail-like protrusion having a narrowed-down neck,
    (b) a hole drilled into the end face of each of said boards, the opening of said hole of each of said boards converging to a single point in said cross-joint,
    (c) a "cross"-shaped pin, each of four arms of said cross-shaped pin engaging each of said holes drilled into the end face of said four boards,
    (d) a first rectangular bar having grooves formed on four sides of said first rectangular bar, said grooves having a narrowed-down opening matching the narrowed-down neck of said rail-like protrusion, said first rectangular bar being inserted into and filling the front half of the cavity formed between the end faces of said four boards with said rail-like protrusions, said front half being the front portion of said cavity from said cross-shaped pin to said front edges, and
    (e) a second rectangular bar having grooves formed on four sides of said second rectangular bar, said grooves having narrowed-down opening matching the narrowed-down neck of said rail-like protrusion, said second rectangular bar being inserted into and filling the rear half of the cavity formed between the end faces of said four boards with said rail-like protrusions, said rear half being the rear portion of said cavity from said "cross"-shaped pin to said rear edges.

2. The combination as set forth in claim 1 wherein one of said four boards is deleted and said "cross"-shaped pin is replaced with "Tee" shaped pin, whereby, said apparatus provides a "Tee"-joint joining three boards in "T" shaped cross section.

3. The combination as set forth in claim 2 wherein said first and second rectangular bars having said grooves formed on four sides of said rectangular bars are replaced with rectangular bars with grooves formed on three sides of said rectangular bars.

4. The combination as set forth in claim 1 wherein two of said four boards are deleted and said "Cross"-shaped pin is replaced with L-shaped pin, whereby, said apparatus provides an L-shaped joint joining two boards in "L"-shaped cross section.

5. The combination as set forth in claim 4 wherein said first and second rectangular bars having said grooves formed on four sides of said rectangular bars are replaced with rectangular bars with grooves formed on two adjacent sides of said bars.

6. The combination as set forth in claim 1 wherein two of said four boards are deleted and said "cross"-shaped pin is replaced with a "straight" pin, whereby, said apparatus provides a "straight" joint joining two boards in straight configuration.

7. The combination as set forth in claim 6 wherein said first and second rectangular bars having said grooves formed on four sides of said rectangular bars are replaced with rectangular bars with grooves formed on two opposing sides of said bars.

* * * * *